March 17, 1970  W. G. HANLEY ET AL  3,501,202
AXLE BEAM FORMED FROM A SINGLE PIECE OF METAL
Filed June 5, 1969  2 Sheets-Sheet 1
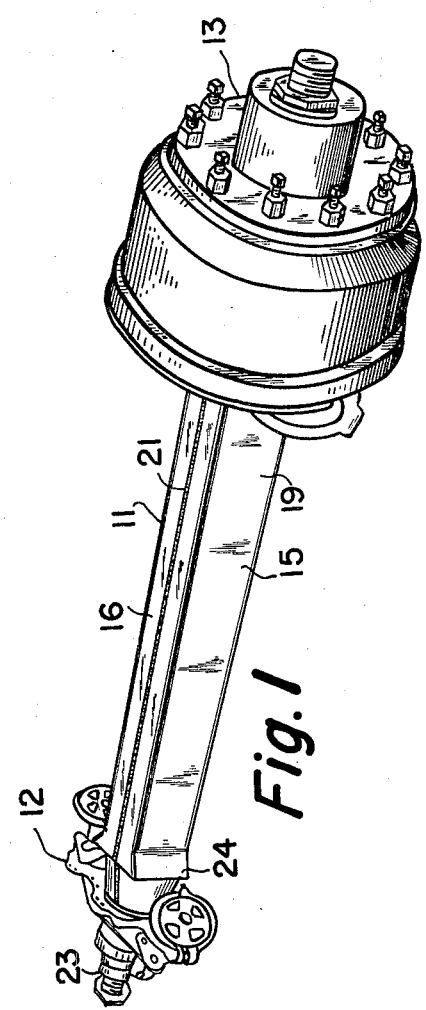
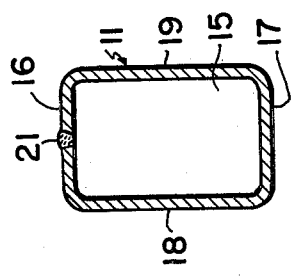
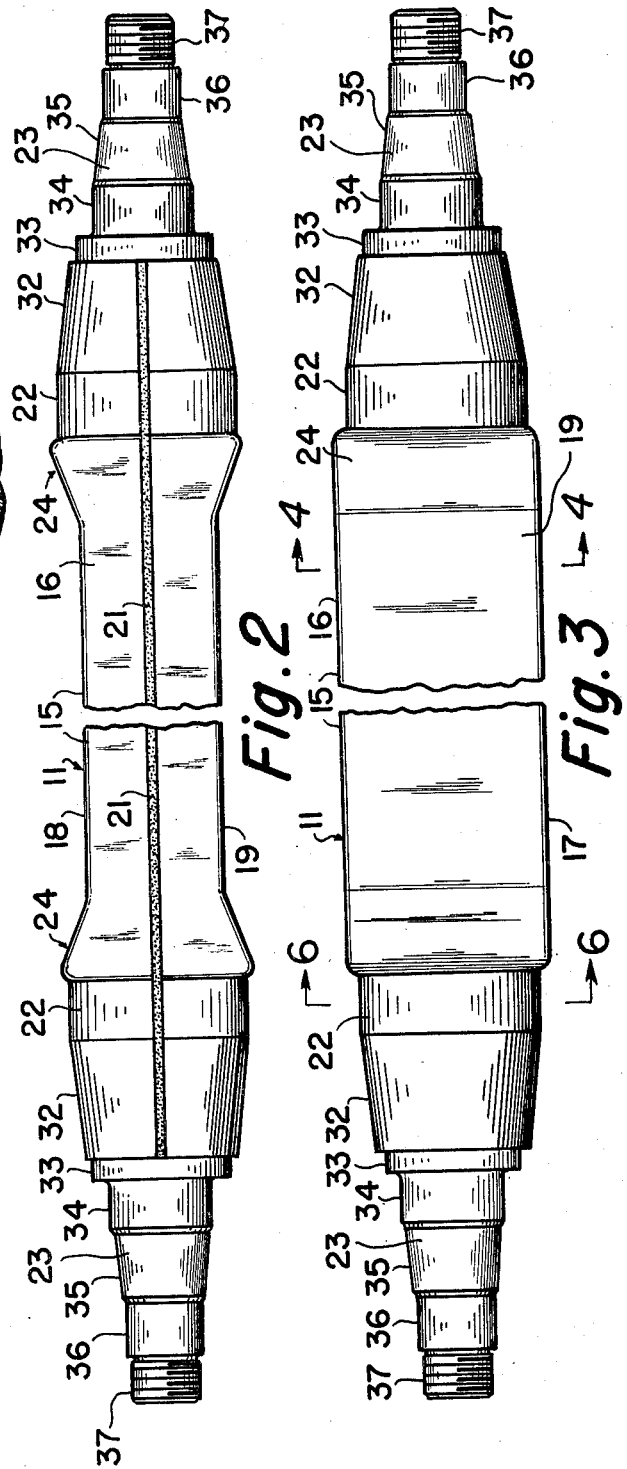

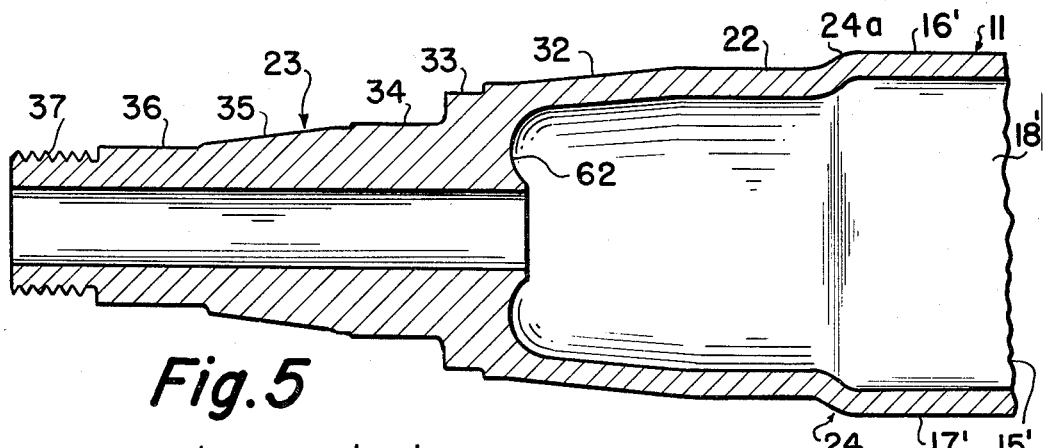
Fig.5
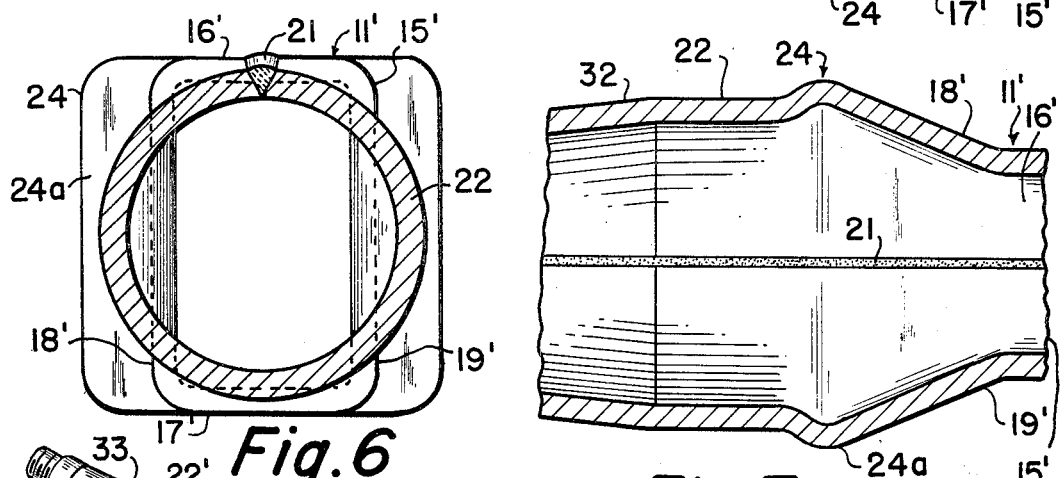
Fig.6
Fig.7
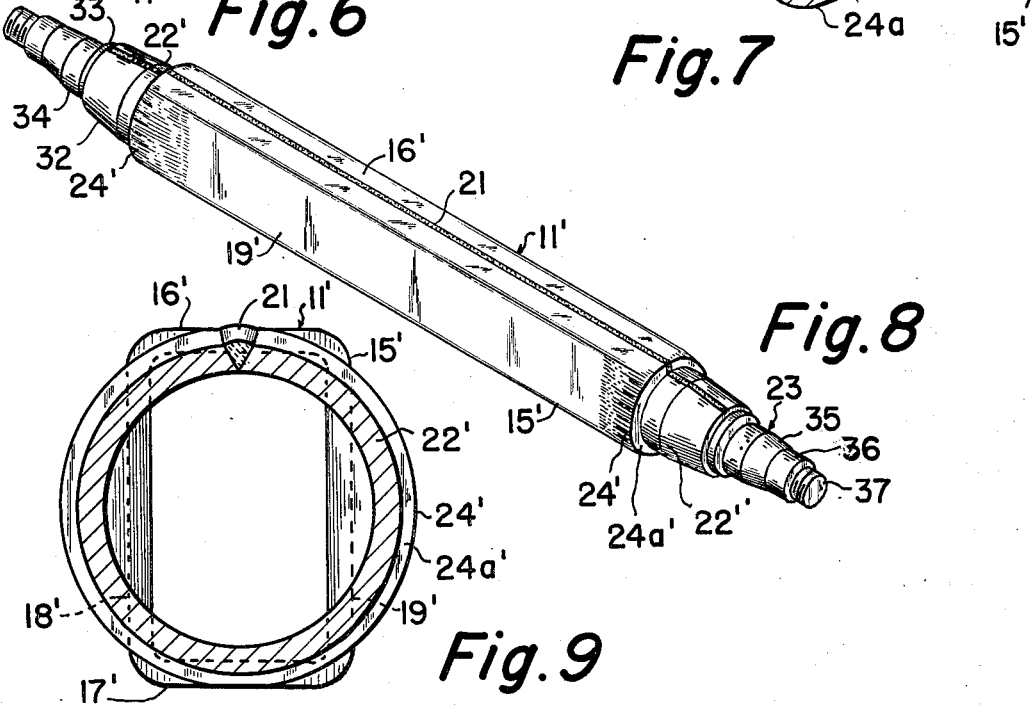
Fig.8
Fig.9

United States Patent Office 3,501,202
Patented Mar. 17, 1970

3,501,202
AXLE BEAM FORMED FROM A SINGLE
PIECE OF METAL
William G. Hanley and John Palovcik, Kenton, Ohio, assignors to North American Rockwell Corporation, Pittsburgh, Pa., a corporation of Delaware
Continuation-in-part of application Ser. No. 672,926, Oct. 4, 1967, which is a continuation of application Ser. No. 483,550, Aug. 30, 1965. This application June 5, 1969, Ser. No. 830,718
Int. Cl. B60b 35/08
U.S. Cl. 301—124                    4 Claims

ABSTRACT OF THE DISCLOSURE

A hollow axle beam formed integrally from a single piece of metal, the axle beam including a center section of rectangular cross-section of uniform size from end to end and identical opposite end sections. Each end section includes a cylindrical brake mechanism mounting section and is connected to the adjacent end of the rectangular center section by a transition section longitudinally outwardly changing from rectangular to cylindrical shape, the transition section having a vertical portion adjacent the brake mounting section, the entire periphery of which is spaced from the axis of the brake mounting section a distance at least equal to the radius of the brake mounting section.

---

This application is a continuation-in-part of copending patent application Ser. No. 672,926, entitled "Vehicle Axle, Axle Assembly and Method of Assembly," filed on Oct. 4, 1967, by the inventors of this application and assigned to the assignee of this application. The said copending application Ser. No. 672,926 is a continuation of patent application Ser. No. 483,550, now abandoned, for "Trailer Axle Assembly and Method of Assembly," filed on Aug. 30, 1965, also by the present applicants and assigned to the present assignee.

This invention relates to trailer and like axle assemblies and particularly to such axle assemblies of special elemental combination and simplified structure whereby an easily assembled axle assembly of improved strength is obtained.

The invention provides for the first time a one-piece tubular trailer axle made from a single sheet of metal and formed into a hollow tubular beam that has a rectangular cross-section center section and two end sections including cylindrical portions forming a brake mechanism support upon which a brake spider may be welded.

A major object of this invention is to provide a novel one-piece trailer or like axle beam formed by bending a single sheet of metal about an axis parallel to its length, welding the adjacent longitudinal side edges together and forming the end sections to accept the brake mechanism support.

It is another object of the invention to provide for the first time a novel one-piece tubular axle beam having a rectangular welded center section and cylindrical end sections adapted to mount welded-on brake spiders.

Further objects of the invention will appear as the description proceeds in connection with the appended claims and the annexed drawings wherein:

FIGURE 1 is a substantially perspective view of an axle assembly according to one embodiment of the invention, with the wheel hub omitted from one end;

FIGURE 2 is a top plan view of the axle beam of FIGURE 1 apart from the remainder of the assembly;

FIGURE 3 is a side elevation of the axle beam of FIGURE 2;

FIGURE 4 is a transverse section of the rectangular center section of the axle beam substantially on line 4—4 of FIGURE 3;

FIGURE 5 is an axial side section showing the wall thickness and contour at each end of the axle beam of FIGURES 1-4;

FIGURE 6 is a section substantially on line 6—6 of FIGURE 3 showing changes in beam cross section;

FIGURE 7 is an axial plan section showing the wall thickness and contour at each end of the axle beam of FIGURES 1-4;

FIGURE 8 is a substantially perspective view of an axle beam formed in accordance with another embodiment of the invention; and FIGURE 9 is a view similar to FIGURE 6 showing the changes in beam cross section of the axle beam of FIGURE 9.

The trailer axle assembly shown in FIGURE 1 consists essentially of a tubular beam 11, brake mechanism supports 12 fixed upon the beam at opposite ends, and wheel hubs 13 rotatably mounted on wheel mounting spindles at the opposite beam ends by means of suitable bearings.

Beam 11 is integral from end to end and is formed entirely from a single sheet of suitable thickness steel or like bendable metal that is die forged about an axis parallel to its length to form a closed contour cross-section and then the matching engaged opposite longitudinal edges of the formed sheet are welded together along their entire length in a straight line weld region 21 that permanently holds the contour.

The beam center section 15 is rectangular in cross section as shown in FIGURE 4 and of uniform size from end to end, having parallel horizontal top and bottom walls 16 and 17 and parallel side walls 18 and 19. The weld region 21 which joins the opposite edges of the original sheet is preferably located to extend straight along the middle of the top wall 16, so as to be in compression during normal body weight and other load stresses exerted on the beam in normal operation. For overall strength and rigidity in combination with minimum weight, it is desirable that the side walls 18 and 19 have greater vertical height than the top and bottom walls 16 and 17 have transverse width.

At each end, the axle beam 11 is contoured to form in axially outward succession a transition section 24, a cylindrical brake mechanism mounting section 22, and a wheel mounting spindle section 23. Section 22 is cylindrical in cross section as shown by FIGURE 6, its external diameter being substantially larger than the transverse width of the top and bottom walls 16 and 17 of the center section 15 and slightly smaller than the vertical height of the side walls 18 and 19. The axle beam transition section 24 between the rectangular center section 15 and the cylindrical brake mounting section 22 has a constantly longitudinally changing wall shape. In the embodiment of FIGURES 1-7, as best illustrated by FIGURES 5-7, the transition section 24 includes planar wall portions 16' and 17' comprising horizontal extensions of the top and bottom walls 16 and 17 and planar wall portions 18' and 19' comprising axially outwardly diverging extensions of the side walls 18 and 19. The wall extensions 16', 17', 18' and 19' terminate in a vertical portion 24a closely adjacent the section 22, the portion 24a having a generally square cross section as best illustrated by FIGURE 6. It will be noted that the entire periphery of the portion 24a is located radially outwardly of the adjacent peripheral portion of the section 22. Stated differently, the entire periphery of the portion 24a is spaced from the axis of the section 22, a distance greater than the radius of the section 22. From the portion 24a, the transition section 24 converges rapidly to the diameter of the closely adjacent brake mechanism mounting section 22.

Axially outward of brake mount section 22 at each end (FIGURE 5) the beam 11 has wheel supporting spindles including a first decreasingly tapered regular conical section 32, a relatively short reduced diameter cylindrical seal mount section 33, a reduced diameter cylindrical inner bearing mount section 34, a second decreasingly tapered regular conical section 35, and reduced diameter cylindrical outer bearing mount section 36 and a threaded terminal 37. The wheel hubs 13 are suitably mounted upon the spindles in accordance with the teaching of the aforesaid copending patent application Ser. No. 672,926.

Axle beam 11 is preferably fabricated from a single suitably thick sheet of steel of predetermined length and width by the forging and swaging operations and apparatus disclosed in copending application Ser. No. 484,856, filed Sept. 3, 1965, and entitled "Method of Making One-Piece Tubular Vehicle Axle." In a preferred embodiment the rectangular axle center section 15 is about four inches wide and six inches deep, the other parts having corresponding relative dimensions as illustrated.

As a consequence of the swaging of the spindle ends the cylindrical beam wall is thickened considerably at the bearing mount sections 34 and 36 as shown in FIGURE 5 and it has maximum thickness at the annular region 62 just axially inwardly of the larger inner wheel bearing where a sharp increase in bending stress is encountered.

An alternative embodiment of the invention is illustrated by FIGURES 8 and 9, the axle beam 11' of this embodiment having a center section 15' and cylindrical brake mounting section 22' substantially identical to the corresponding portions of the axle of FIGURES 1–7. The transition sections 24' of this embodiment, however, include vertical portions 24a' of circular rather than square cross section closely adjacent the cylindrical brake mechanism supports 22'. As illustrated by FIGURE 9, the entire periphery of the portion 24' is spaced radially outward of the closely adjacent cylindrical surface of the mounting section 22'. Sufficient strength can be provided so long as the portion 24a' is at all peripheral points spaced from the axis of section 22' a distance at least equal to the radius of the section 22'.

The axle assembly of the invention represents a desirable improvement in the art in that it provides a stronger axle using less weight of steel. This is accomplished essentially by forming the single weld rectangular center section 15 resulting in an optimum which provides at this region increased resistance to bending, torque and other stresses normally encountered during vehicle operation. For example, the section modulus of an axle beam externally dimensioned four by six inches in the rectangular center section with a wall thickness of about 11/32" is about 9.23, as compared to prior hollow trailer axle separate center sections of square cross section and forced by two welds joining U-shaped upper and lower members having a section modulus of only 7.40.

The invention may be embodied in other specific forms without departing from the spirit or essential characteristics thereof. The present embodiments are therefore to be considered in all respects as illustrative and not restrictive, the scope of the invention being indicated by the apended claims rather than by the foregoing description, and all changes which come within the meaning and range of equivalency of the claims are therefore intended to be embraced therein.

What is claimed and desired to be secured by Letters Patent is:

1. A hollow metal trailer or like axle beam formed integrally from a single piece of metal comprising:
    (a) a center section of rectangular cross section of uniform size from end to end and identical opposite end sections,
    (b) each said end section comprising a cylindrical brake mechanism support mounting section connected to the adjacent end of said rectangular center section by a transition section longitudinally outwardly changing from rectangular to cylindrical shape,
        said transition section having a vertical portion adjacent said brake mechanism mounting section, the entire periphery of said vertical portion being spaced from the axis of said brake mechanism mounting section a distance at least equal to the radius of said brake mechanism mounting section,
        said brake mechanism mounting section having a diameter that is greater than the length of at least one side of said center section.

2. A one-piece hollow metal trailer or like axle beam as defined in claim 1, wherein said rectangular cross section is of such dimensions that said one side is a shorter side, and said shorter side is disposed top and bottom in the beam.

3. A one-piece hollow metal trailer or like axle beam a defined in claim 2, wherein said vertical portion of said transition section has a generally square cross section.

4. A one-piece hollow metal trailer or like axle beam as defined in claim 2, wherein said vertical portion of said transition section has a generally circular cross section.

References Cited

UNITED STATES PATENTS

| | | | |
|---|---|---|---|
| 1,986,949 | 1/1935 | Urschel | 301—124 |
| 2,124,406 | 7/1938 | Spatta | 301—124 |
| 2,611,656 | 9/1952 | Vanderberg | 301—124 |
| 3,269,214 | 8/1966 | Nagel | 74—607 |

RICHARD J. JOHNSON, Primary Examiner